United States Patent
Gregorski (10) Patent No.: US 10,295,747 B2
(45) Date of Patent: May 21, 2019

(54) SYSTEMS AND METHODS FOR SCRIBING AND CLEAVING AN OPTICAL FIBER HELD BY A FERRULE

(71) Applicant: CORNING OPTICAL COMMUNICATIONS LLC, Hickory, NC (US)

(72) Inventor: Steven Joseph Gregorski, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 253 days.

(21) Appl. No.: 15/145,928

(22) Filed: May 4, 2016

(65) Prior Publication Data

US 2017/0139138 A1 May 18, 2017

Related U.S. Application Data

(60) Provisional application No. 62/254,464, filed on Nov. 12, 2015.

(51) Int. Cl.
| | |
|---|---|
| *G02B 6/25* | (2006.01) |
| *G02B 6/38* | (2006.01) |
| *B26D 3/08* | (2006.01) |
| *B26F 3/00* | (2006.01) |

(52) U.S. Cl.
CPC .............. *G02B 6/25* (2013.01); *B26D 3/08* (2013.01); *B26F 3/002* (2013.01); *G02B 6/3833* (2013.01)

(58) Field of Classification Search
CPC .......... G02B 6/25; G02B 6/3833; B26D 3/08; B26F 3/002
See application file for complete search history.

(56) References Cited

U.S. PATENT DOCUMENTS

| | | |
|---|---|---|
| 4,245,537 A | 1/1981 | Curtis |
| 8,306,382 B2 | 11/2012 | Raker et al. |
| 8,622,270 B2 | 1/2014 | Barnes et al. |
| 8,746,525 B2 | 6/2014 | Pepin et al. |
| 2012/0141082 A1 | 6/2012 | Sawicki et al. |

FOREIGN PATENT DOCUMENTS

| | | |
|---|---|---|
| FR | 2386829 A1 | 11/1978 |
| JP | 62007004 A | 1/1987 |

*Primary Examiner* — Omar Flores Sanchez
(74) *Attorney, Agent, or Firm* — Adam R. Weeks (57) ABSTRACT

Systems and methods for scribing and cleaving an optical fiber held by a ferrule are disclosed. The methods include operably supporting an optical fiber in a ferrule so that a bare fiber section of the optical fiber extends beyond a front end of the ferrule. The method also includes disposing a top-side location of a scribing medium to be in contact with a lower portion of the bare fiber section and a near-side location of the scribing medium to be in contact with the front end of the ferrule. The top-side location includes an abrasive feature while the near-side location is smooth. The scribing medium is moved relative to the bare fiber section to cause the abrasive feature to form a scribe mark at a scribe location at a distance from the front end of the ferrule. The smooth near-side location prevents substantial damage to the ferrule front end.

24 Claims, 7 Drawing Sheets

SYSTEMS AND METHODS FOR SCRIBING AND CLEAVING AN OPTICAL FIBER HELD BY A FERRULE

FIELD

This application claims the benefit of priority under 35 U.S.C. § 119 of U.S. Provisional Application Ser. No. 62/254,464, filed on Nov. 12, 2015, the content of which is relied upon and incorporated herein by reference in its entirety.

FIELD

The present disclosure relates to optical fibers and optical fiber connectors, and in particular relates to systems and methods for scribing and cleaving an optical fiber held by a ferrule such as used in optical fiber connectors.

BACKGROUND

Optical fiber connectors are used in a variety of optical telecommunications applications and optical device applications to establish optical communication between optical-based apparatus, components etc. Optical fiber connectors are configured to operably support one or more optical fibers at the respective ends of the optical fibers.

One way an optical fiber is supported in an optical fiber connector is through the use of a ferrule, which is a sleeve that includes a bore sized to accommodate the optical fiber (or multiple bores in the event of multiple optical fibers). The ferrule includes a front end with surface (e.g., a substantially planar surface) at which the end face of the optical fiber resides.

One process for operably arranging the optical fiber in the ferrule includes stripping off a portion of the non-glass (e.g., polymer) coating to expose the underlying glass fiber section. This bare fiber section is then inserted into the ferrule bore from the back end of the ferrule so that a portion of the bare fiber section extends beyond the front end of the ferrule. The bare fiber section is then cleaved and the exposed end face is then polished to define a polished end face that is free of defects and substantially co-planar with (e.g., within +/−200 nanometers of) the surface of the ferrule front end.

A problem with this approach is that cleaving the optical fiber after it is inserted into the ferrule is typically accomplished a relatively large distance away from the ferrule front end, e.g., much greater than 100 microns. One reason for this large distance is to avoid damaging the surface at the ferrule front end during the cleaving process. Such a large distance is undesirable because it requires that the polishing step reduce a substantial amount of bare optical fiber, and there is also the risk that such a large portion of bare optical fiber section can break off during polishing. It would therefore be preferable to be able to cleave the fiber at a much closer distance to the ferrule front end without the risk of damaging the front-end surface of the ferrule so that the subsequent polishing step can be performed more quickly and efficiently.

SUMMARY

An aspect of the disclosure includes a method of scribing at least one bare fiber section of at least one optical fiber. The method includes: operably supporting the at least one optical fiber in a ferrule so that the at least one bare fiber section extends beyond a front end of the ferrule; disposing a top-side location of a scribing medium to be in contact with a lower portion of the at least one bare fiber section and a near-side location of the scribing medium to be in contact with the front end of the ferrule, wherein the top-side location includes an abrasive feature and wherein the near-side location is smooth; and moving the scribing medium relative to the at least one bare fiber section to cause the abrasive feature to form in the at least one bare fiber section a scribe mark at a scribe location at a distance from the front end of the ferrule.

Another aspect of the disclosure is a method of performing cleaving of a bare fiber section of an optical fiber using a scribing medium having a length, a radius R, and an outer surface with a top-side location and a near-side location. The method includes: a) supporting the bare fiber section in a bore of a ferrule that includes a front end having a front-end surface, with the bare fiber section extending beyond the front end of the ferrule and having an outer surface with a lower portion that in combination with the front-end surface defines a wedge location; b) disposing the scribing medium in the wedge location such that the top-side location contacts the lower portion of the bare fiber section and the near-side location is in contact with the front-end surface of the ferrule, wherein the near-side location is smooth and the top-side location includes an abrasive feature that runs along the length of the scribing medium; c) moving the scribing medium under tension relative to the bare fiber section so that the abrasive feature defines a scribe mark in the lower portion of the bare fiber section at a distance from the front-end surface that is substantially equal to the radius R of the scribing medium, and wherein the smooth near-side surface does not substantially damage the front-end surface; and d) cleaving the bare fiber section at the scribe mark.

Another aspect of the disclosure is a system for forming a scribe mark in at least one bare fiber section of at least one optical fiber. The system includes: a ferrule having at least one bore and a front end that defines a front-end surface, the at least one bore being configured to support the at least one optical fiber with the at least one bare fiber section extending beyond the ferrule front end; a scribing medium having a radial dimension R and an outer surface with a top-side location that includes an abrasive feature and a near-side location that is smooth, wherein the scribing medium is disposed with the near-side location in contact with the front-end surface and the abrasive feature is in contact with a lower portion of the at least one bare fiber section; and a support fixture that movably supports the scribing medium and that causes the scribing medium to move relative to the at least one bare fiber section to form the scribe mark in the lower portion of the at least one bare fiber section at a distance from the front-end surface that is substantially equal to the radial dimension R of the scribing medium.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and to facilitate the discussion, and are not intended to be limiting as to direction or orientation.

Figure 1A:
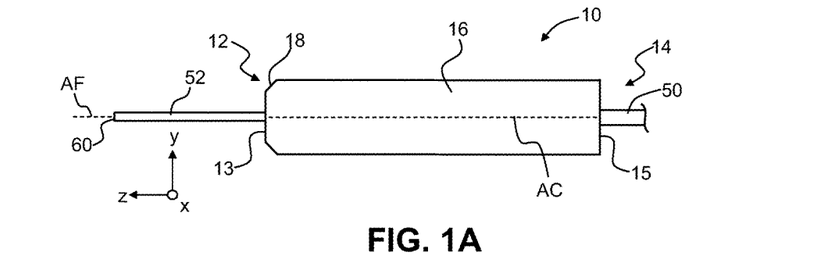
FIG. 1A is a side view of an example ferrule that holds an optical fiber with the bare fiber section extending from the ferrule front end.
Figure 1B:
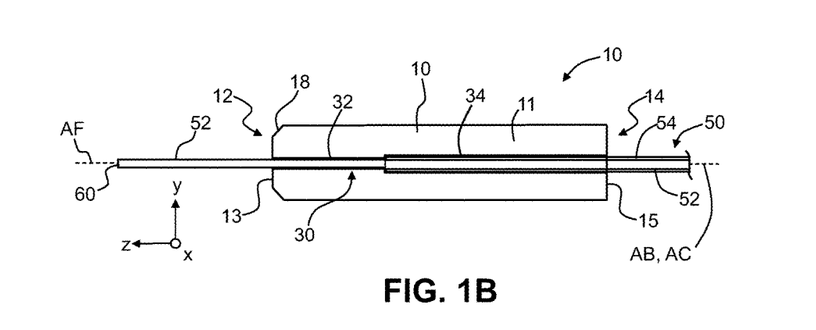
FIG. 1B is a cross-sectional view of the ferrule and optical fiber of FIG. 1A as viewed in the x-z plane.

FIG. 1A is a side view of an example ferrule 10 that holds an optical fiber 50, while FIG. 1B is a cross-sectional view of the ferrule and optical fiber as seen in the y-z plane. The ferrule 10 includes a body 11 and a central ferrule axis AF. An example material for body 11 of ferrule 10 is zirconia or a ceramic. The body 11 defines a front end 12 with a front-end surface 13, a back end 14 with a back surface 15, and an outer surface 16. In an example, front-end surface 13 is substantially planar (e.g., the front-end surface may have a radius of curvature less than 25 millimeters and/or have a physical contact (PC) or ultra physical contact (UPC) polish). Indeed, front-end surface 13 is shown in the Figures by way of example as being completely planar for ease of illustration. Those skilled in the art will also appreciate that the concepts disclosed herein may apply to ferrules with angled end faces as well (e.g., angled physical contact (APC) polishes).

In an example, body 11 includes a bevel 18 at front end 12 between front-end surface 13 and outer surface 16. The body 11 of ferrule 10 also includes a central bore 30 that runs between front end 12 and back end 14. The central bore 30 has a central bore axis AB that in an example is co-axial with ferrule central axis AC.

The central bore 30 is configured to accommodate optical fiber 50. The optical fiber 50 includes a central glass section 52 defined by a central glass core and a glass cladding that surrounds the central glass core (not shown) and an outer protective layer 54 that surrounds the central glass section. In an example, outer protective layer 54 is non-glass and is made of polymer (e.g., polyurethane acrylate). In the discussion herein, the portion of optical fiber 50 that has its outer protective layer 54 stripped away to reveal the central glass section is referred to as "bare fiber section" 52. The bare fiber section 52 includes an outer surface 56 having a lower portion 58 and an end face 60. In one example, bare fiber section 52 has a radius of 62.5 microns while the coated optical fiber 50 has a radius of 125 microns.

In an example, bore 30 includes a front-end section 32 sized to accommodate bare fiber section 52 and a back-end section sized to accommodate a coated portion of optical fiber 50. The optical fiber 50 is arranged in bore 30 such that bare fiber section 52 extends beyond front end 12 of ferrule 10.

Figure 1C:
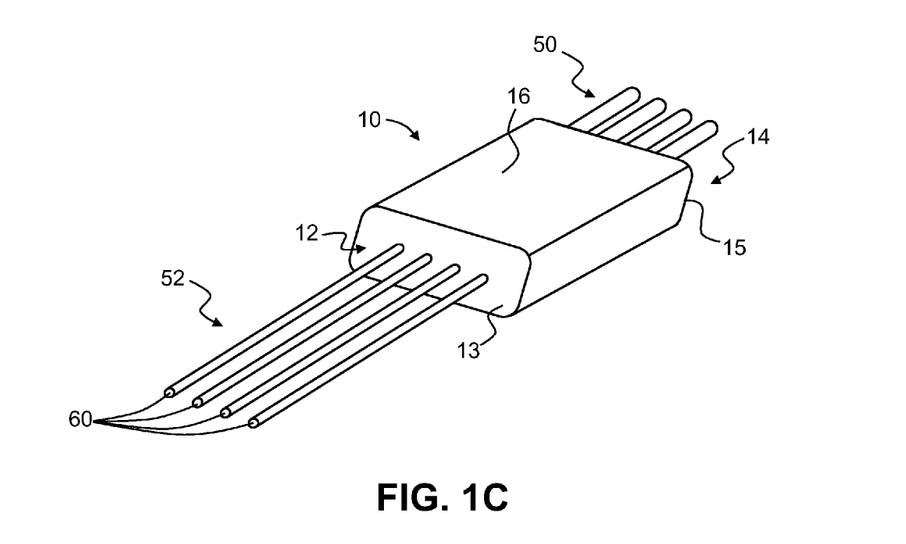
FIG. 1C is a front-elevated view of an example ferrule configured to support multiple optical fibers.

Other types of ferrules 10 can be employed in the systems and methods disclosed herein, such as ferrules that support multiple fibers in multiple bores. For example, FIG. 1C is a front-elevated view of an example ferrule 10 configured to support multiple optical fibers 50. A single-fiber ferrule is shown and discussed herein by way of illustration only, and the systems and methods disclosed herein are understood as being applicable to at least one optical fiber 50, including multiple optical fibers supported by a multi-fiber ferrule 10, as shown in FIG. 1C. In examples where multiple optical fibers 50 are involved, the bare fiber sections 52 can be processed individually (i.e., one at a time), or some of the multiple bare fiber sections can be processed at a time, or all of the bare fiber sections can be processed at one time. In an example, ferrule 10 includes a single bore 30 that operably supports a single optical fiber 50.

Figure 1D:
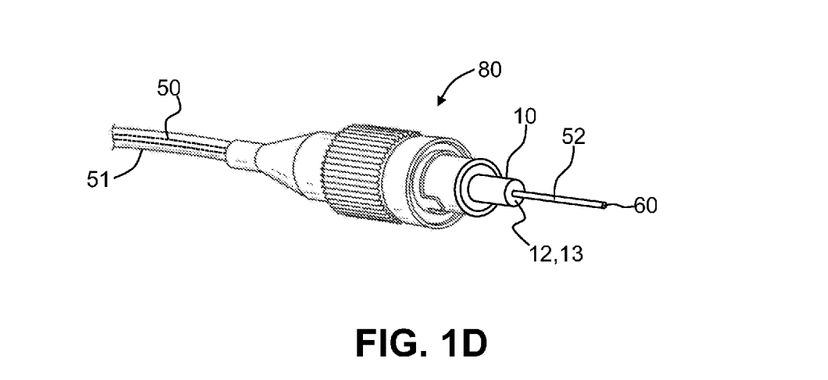
FIG. 1D is a front-end view of an example optical fiber connector that includes the ferrule and optical fiber of FIGS. 1A and 1B.

FIG. 1D is a front-end view of an example optical fiber connector 80 that includes the ferrule 10 and optical fiber 50 of FIGS. 1A and 1B. The optical fiber 50 is shown as being included in an optical fiber cable 51 while bare fiber section 52 extends from ferrule front end 12. FIG. 1D illustrates an example configuration in which bare fiber section 52 can be processed using the methods disclosed herein, i.e., by ferrule 10 being operably supported within an optical fiber connector 80.

Figure 2A:
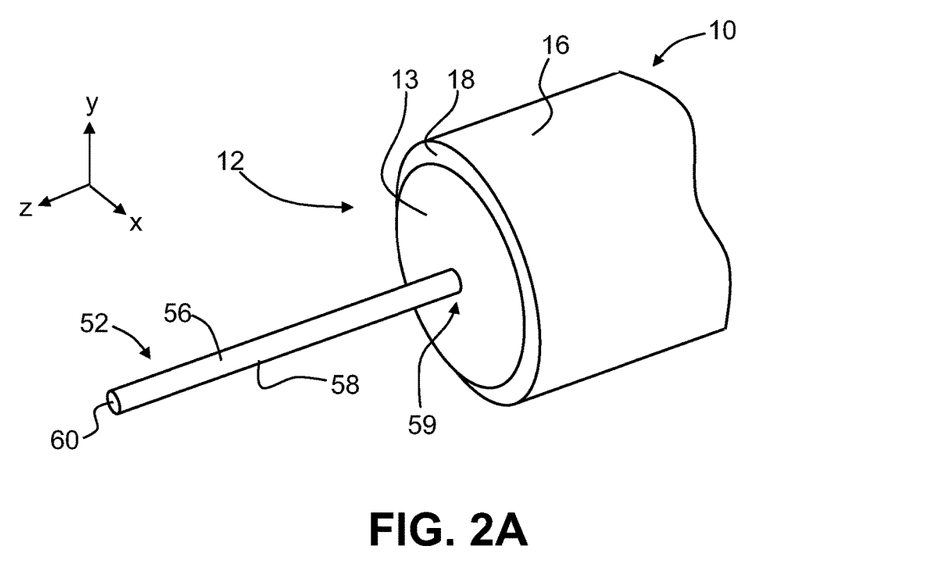
FIG. 2A is a close-up front elevated view of the front end of the ferrule and the bare fiber section of the optical fiber that extends beyond the ferrule front end.

FIG. 2A is a close-up front elevated view of front end 12 of ferrule 10 and shows bare fiber section 52 extending beyond the ferrule front end 12. The intersection of bare fiber section 52 at lower portion 58 and front-end surface 13 of ferrule front end 12 define a wedge location 59 that is useful in performing the cleaving operation described herein.

Scribing Medium

Figure 2B:
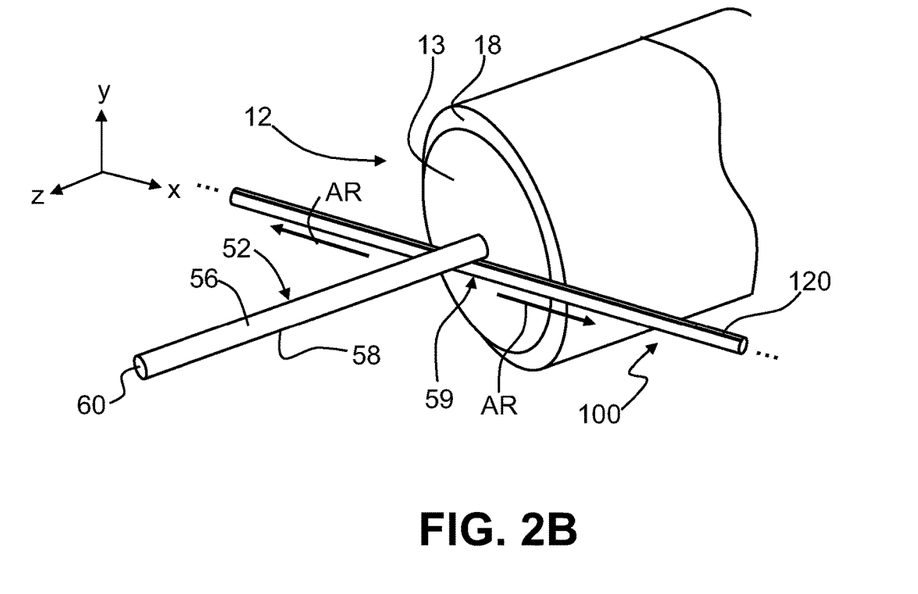
FIG. 2B is similar to FIG. 2A and further shows a scribing medium operably disposed relative to the ferrule front end and the bare fiber section.
Figure 3A:
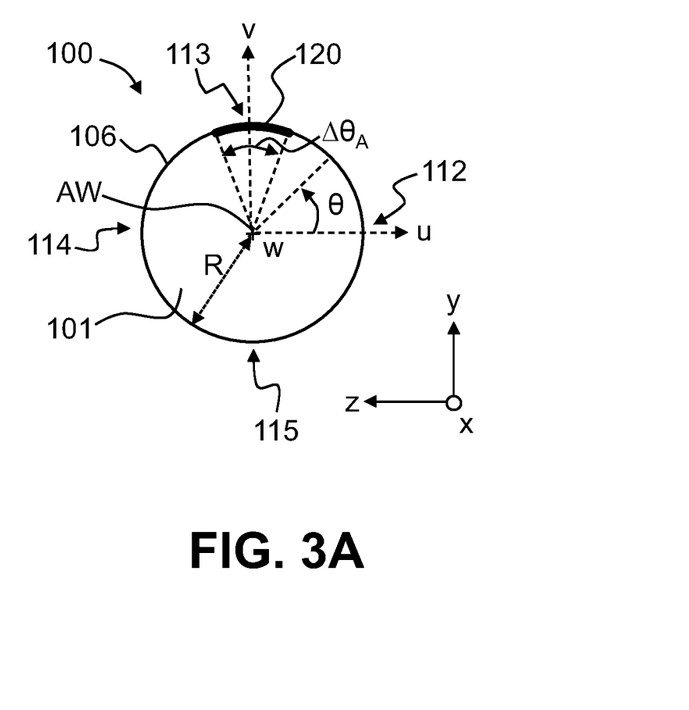
FIG. 3A is an end-on view of the scribing medium looking in the −x direction and showing a top location of the scribing medium that includes a linear abrasive feature on an otherwise smooth outer surface.
Figure 3B:
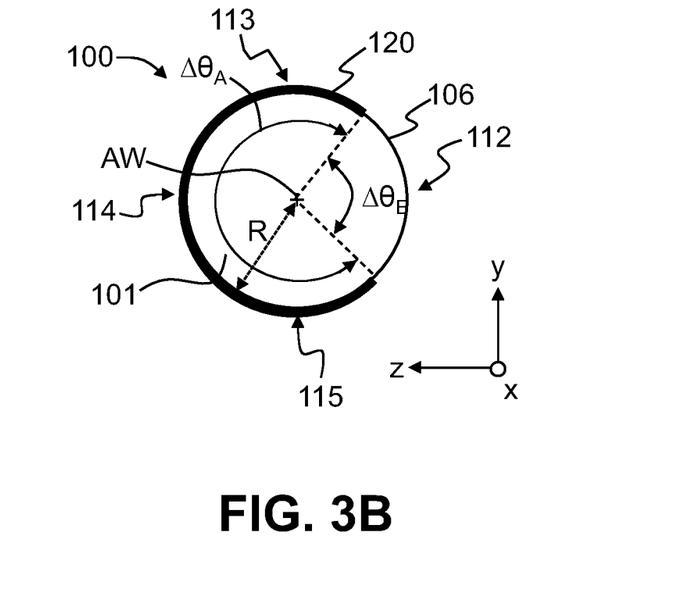
FIG. 3B is similar to FIG. 4A and shows an example abrasive feature that includes a relatively large portion of the outer surface of the scribing medium except for a smooth portion that includes the near-side location.
Figure 4A:
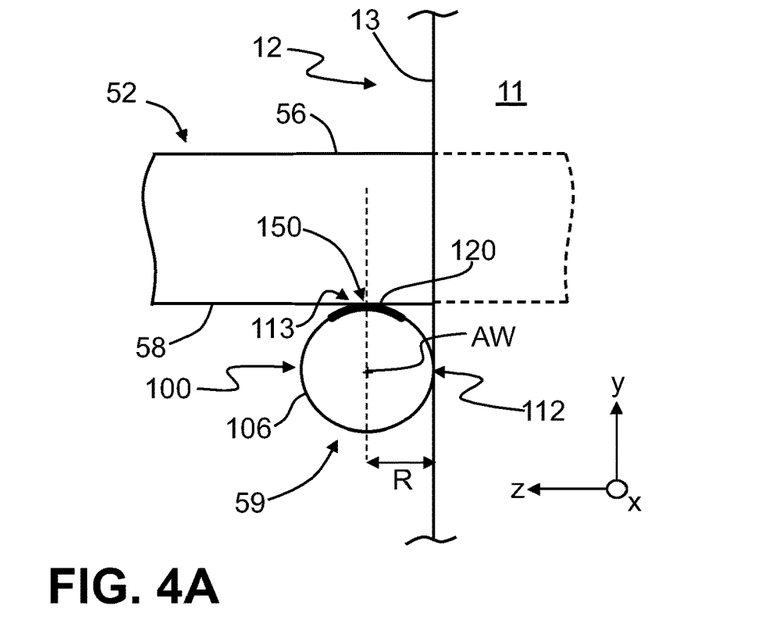
FIG. 4A is a close-up side view of the arrangement of FIG. 2B and shows how the abrasive feature of the scribing medium makes contact with the lower surface of the bare fiber section at a distance R from the ferrule front end while the smooth side of the scribing medium makes contact with the front-end surface of the ferrule.

FIG. 2B is similar to FIG. 2A and further shows a scribing medium 100 operably disposed relative to front end 12 of ferrule 10 and to bare fiber section 52 that extends from bore 30 past the front end. In an example, scribing medium 100 comprises a wire. FIG. 3A and FIG. 3B are end-on views of an example scribing medium 100 looking in the −x direction. FIG. 4A is a close-up side view of the arrangement of FIG. 2A and showing how the scribing medium 100 is disposed in wedge location 59.

In an example, scribing medium 100 includes a body 101 with a central axis AW and an outer surface 106. In an example, body 101 has a round or circular cross-section with a radius R as shown, though other cross-sectional shapes can be used. A circular cross-sectional shape is discussed below for ease explanation. For non-circular cross-sectional shapes, the radius R represents a select radial dimension (e.g., the greatest radial dimension, the narrowest radial dimension, or an intermediate radial dimension) of the given cross-sectional shape. Thus, "radius R" is a special case of the more general radial dimension.

An example radial dimension R for scribing medium 100 is in the range 10 microns≤R≤50 microns. Scribing medium 100 can be made of essentially any material that can withstand the tensions associated with a fiber cleaving process. Example materials for scribing medium 100 include tungsten, stainless steel, copper, nickel-chromium, polymer, monofilament, etc.

A local Cartesian coordinate system (u,v,w) is shown centered on the central axis AW of scribing medium 100, with the w-axis running along the scribing medium central axis. A positive angle θ is measured counter-clockwise from the u-axis toward the +v-axis and a negative angle θ is measured clockwise from the u-axis toward the −v-axis. As best seen in FIG. 3A, outer surface 106 includes a number of locations of interests that can be defined using angle θ of the localized coordinate system in the (u,v) plane and whose relevance is discussed in greater detail below. These locations include a near-side location 112 defined by θ=0 radians (rads), a top-side location 114 defined by θ=π/2 rads, a far-side location 115 defined by θ=π rads, and a bottom-side location 115 defined by θ=3π/2 rads.

The scribing medium 100 includes an abrasive feature 120 on outer surface 106 at least at top-side location 113, wherein the rest of outer surface 106 other than the abrasive feature is smooth. FIG. 3A shows an example abrasive feature 120 that is relative thin and linear i.e., is in the form of a thin line that occupies a relatively narrow angular extent $\Delta\theta_A$ (e.g., about π/6 rads) centered about top-side location 113 and extending in the direction along the length of scribing medium 100 (i.e., along the x-direction; see FIG. 2B). In an example, the angular extent $\Delta\theta_A$ of abrasive feature 120 need not be centered at top-side location 113 and can be in the range π/12 rads≤$\Delta\theta_A$≤π/2 rads or in the range π/6 rads≤$\Delta\theta_A$≤π/3 rads, with the additional condition that the abrasive feature does not intrude into the exclusion region defined by the exclusion angular extent $\Delta\theta_E$ centered on the near-side location 112. The abrasive feature 120 can be continuous in the long direction or can be formed in multiple sections.

FIG. 3B is similar to FIG. 3A and illustrates a larger angular extent $\Delta\theta_A$ (e.g., of about 3π/2 rads) that includes top-side location 113 but that is not centered about the top-side location. In an example, abrasive feature 120 can occupy an angular extent $\Delta\theta_A$ on outer surface 106 that is outside of an exclusion angular extent $\Delta\theta_E$ centered on near-side location 112. In an example, π/2 rads≤$\Delta\theta_E$≤23π/12 rads, i.e., abrasive feature 120 has an angular extend an angular extent $\Delta\theta_A$ that can span from at least θ=π/4 rads to θ=−π/4 rads, which range includes near-side location 112 at θ=0 rads, but does not span the entire possible angular extent of 2π rads, leaving $\Delta\theta_A$ to be as small as π/12 rads (i.e., 15 degrees). In another example, π/2 rads≤$\Delta\theta_E$≤11π/6 rads.

While the exclusion angular extent $\Delta\theta_E$ can in principle be made increasingly smaller (e.g., π/4 rad or π/6 rad or even smaller) about near-side location 112, it also makes it increasingly difficult to effectively use scribing medium 100 for reasons explained below. In the discussion below, a relatively narrow line-type abrasive feature 120 such as shown in FIG. 3A is discussed by way of example.

The abrasive feature 120 may be formed directly on scribing medium 100 in body 101 at outer surface 106. This can be accomplished by roughening a portion of outer surface 106 at least at top-side location 113 and thereabout. Such roughening can be accomplished in one example by abrading body 111 of scribing medium 100 using an abrasive medium 230 (see, e.g., FIG. 5, introduced and discussed below), which can include a material such as diamond, aluminum oxide, silicon carbide, and the like.

Figure 5:
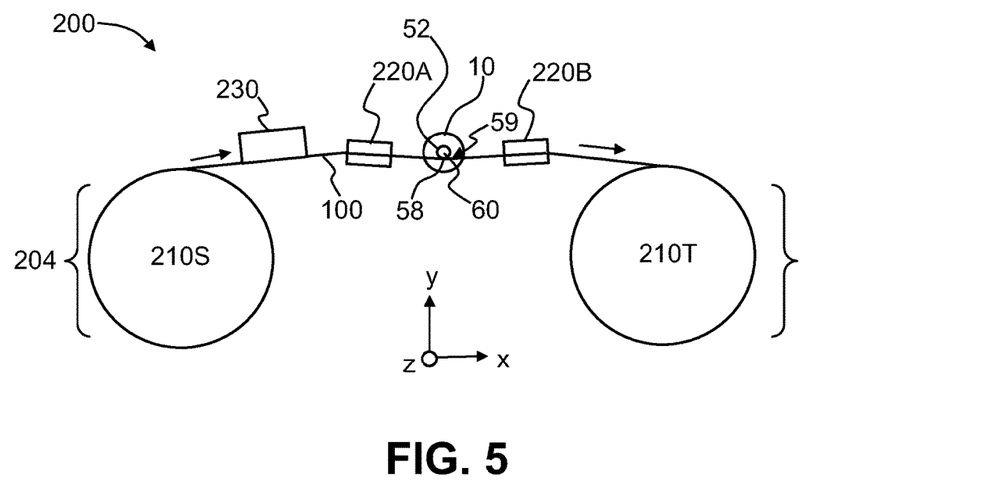
FIG. 5 is a schematic diagram of a scribing system used to perform scribing of the bare fiber section that extends beyond the front end of the ferrule, wherein the system includes an optional abrasive medium used to form the abrasive feature on the scribing medium as the scribing medium moves through the system.

In one example such as shown in FIG. 5, scribing medium 100 is run past the abrasive medium 230 to form abrasive feature 120 along at least a portion of the length of the scribing medium at the top-side location 113. In another example, abrasive feature 120 is added to scribing medium 100, such as by securely depositing a layer of abrasive material at top-side location 113. In yet another example, abrasive feature 120 is formed by rubbing the scribing medium against bare fiber section 52 as part of the scribing process described below. This rubbing action can serve to abrade scribing medium 100 at top-side location 113 and generate dust particles (i.e., glass dust) from the bare fiber section 52 that in turn abrade the scribing medium, thereby forming abrasive feature 120.

With particular reference now to FIGS. 2B and 4A, scribing medium 100 is operably disposed in wedge location 59 so that the top-side location 113 of the scribing medium and abrasive feature 120 make contact with the lower portion 58 of outer surface 56 of bare fiber section 54. Meanwhile, the smooth near-side location 112 of outer surface 106 of scribing medium 100 is in contact with front-end surface 13 of front end 12 of ferrule 10. This configuration of the scribing medium 100 residing in wedge location 59 defines a scribe location 150 on the lower portion 58 of bare fiber section 52 wherein at least a portion of abrasive feature 120 at top-side location 113 makes contact with the bare fiber section.

Note how in this configuration ferrule 10 as well as optical fiber 50 act as alignment guides for scribing medium 100.

This allows the scribing process to be relatively low cost and simple, i.e., it avoids having to use expensive external alignment devices to precisely align the scribing medium 100 relative to the bare fiber section 52. The scribing medium 100 need only be inserted into the wedge location 59 in order for it to be properly aligned to carry out the scribing method. In this regard, the systems and methods disclosed herein can be said to be self-aligning.

The scribe location 150 is located at a distance from front-end surface 13 of front end 12 of ferrule 10 that is substantially equal to the radial dimension R of scribing medium 100. In various examples, "substantially equal to radius R" or "substantially equal to radial dimension R" means either equal to radial dimension or radius R or slightly larger than radial dimension or radius R, e.g., no more than 10% larger than radial dimension or radius R, or no more than 5% larger than radial dimension or radius R, or no more than 2% larger than radial dimension or radius R. The bare fiber section 52 is thus scribed at scribe location 150 by moving the scribing medium 100 generally in the x-direction, or back in forth in the +x and -x-direction, as indicated by arrows AR, while also applying tension so that there is a force component in the +y-direction, i.e., against the lower portion 58 of the bare fiber section.

While near-side 112 of scribing medium 100 is said to be in contact with front-end surface 13 of ferrule front end 12, the contact need not be continuous over the course of the scribing method, i.e., the near-side can move away from the front-end surface slightly. The contact can be initial contact for alignment purposes only, and subsequent contact may be incidental during the movement of scribing medium 100. One of the benefits of the system and methods disclosed herein is that such incidental contact does not substantially damage front-end surface 13, which allows for the scribing method to be performed very close to ferrule front-end 12, i.e., at a distance substantially equal to the radial dimension R of scribing medium 100.

Figure 4B:
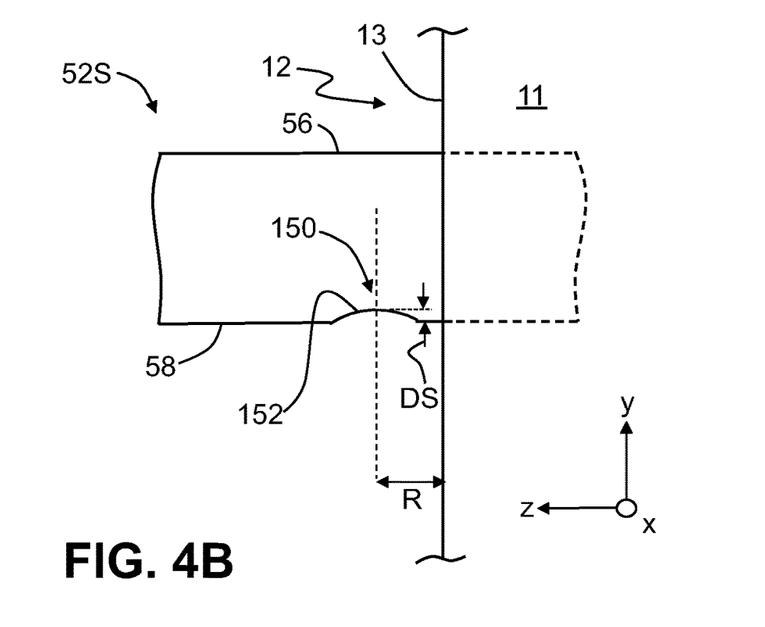
FIG. 4B is similar to FIG. 4A and shows an example scribe mark formed in the bare fiber section by the action of the scribing medium.

The portion of the abrasive feature 120 at top-side location 113 of scribing medium 100 abrades the lower portion 58 of bare glass section 52 to form a scribe mark 152 at the scribe location 150, as shown in FIG. 4B. In an example, scribe mark 152 has the general shape of the outer surface 106 of scribing medium 100 at top-side location 113 and has a scribe depth DS measured from the outer surface 56 of bare fiber section 52. In an example, the scribe depth DS is between 5 microns and 20 microns. It is also observed that the larger the exclusion angular extent $\Delta\theta_E$, the less likely it is that the abrasive feature 120 will inadvertently make contact with front-end surface 13 of ferrule front end 12 and cause substantial damage. Thus in an example, the exclusion angular extent $\Delta\theta_E$ is made as large as possible while still being able to perform the scribing operation that forms a suitable scribe mark 152. The angular extent $\Delta\theta_A$ of abrasive feature 120 need only be large enough to accomplish the desired scribing while not inadvertently damaging front-end surface 13 of ferrule end face 12.

Note once again that the outer surface 106 of scribing medium 100 at near-side location 112 does not include abrasive feature 120 and is therefore a smooth surface. The smooth outer surface 106 at near-side location 112 avoids substantially damaging smooth front-end surface 13 of ferrule front end 12 when the scribing medium 100 is translated to form scribe line 152 in bare fiber section 52. While there may be some damage to front-end surface 13 by the rubbing action of smooth surface 106, the damage is not substantial, i.e., can be polished out later on in the process so that the ferrule 10 does not need to be replaced.

In an example, the scribing method can employ a liquid, such as water or an abrasive slurry, provided to scribe location 150 to facilitate the formation of scribe mark 152. However, in another example, the scribing method is performed dry, i.e., without any such liquid.

Figure 4C:
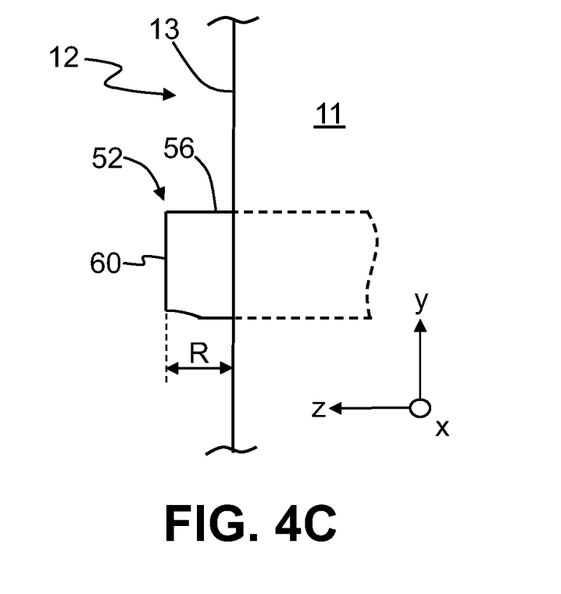
FIG. 4C is similar to FIG. 4B and shows the bare fiber section having been broken off at the scribe mark, leaving a remaining stub bare fiber section.
Figure 4D:
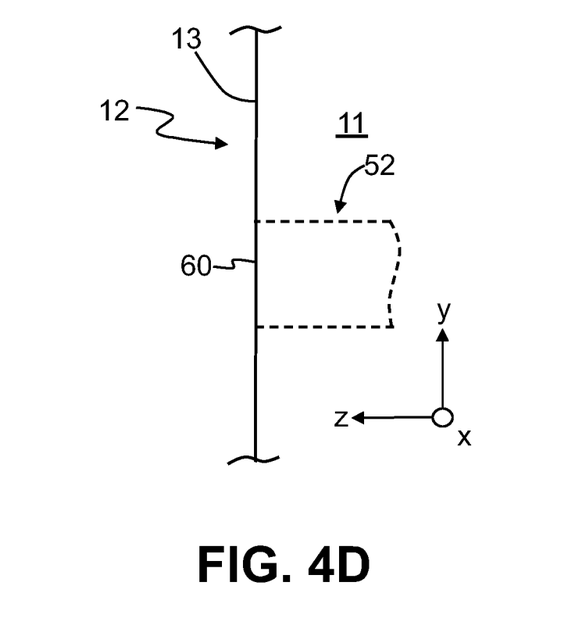
FIG. 4D is similar to FIG. 4C and shows the result of a polishing process that results in the polished end face of the bare fiber section residing substantially co-planar with the front-end surface of the front end of the ferrule.

FIG. 4C is similar to FIG. 4B and shows the bare fiber section 52 after having been scribed and then broken off or "cleaved" at scribe line 152 to leave a stub 52S of bare fiber section 52 that protrudes (extends) past front-end surface 13 of ferrule front end 12. The stub 52S can be polished so that end face 60 is substantially co-planar with (i.e., within +/−200 nanometers of) front-end surface 13 of ferrule front end 12, as shown in FIG. 4D. During this polishing process, any minor damage or defects imparted to front-end surface 13 by the movement of the smooth outer surface 106 of scribing medium 100 can be polished out of the ferrule front end 12. It is noted that because stub 52S is has a stub length that is substantially the same as radial dimension R of scribing medium 100 (as shown in FIG. 4C) and thus typically between 50 microns and 10 microns, the polishing process is greatly simplified as compared to a stub having a length of greater than 100 microns.

Scribing System

FIG. 5 is a schematic diagram of a scribing system 200 used to perform the scribing and cleaving methods disclosed herein. The scribing system 200 includes a support fixture 204 that movably supports scribing medium 100 so that the scribing medium can move relative to bare fiber section 52. The movement of scribing medium 100 can be in one direction or back and forth. In an example, support fixture 204 includes a source spool 210S that stores scribing medium 100 (and is thus the "source" of the scribing medium) and a take-up spool 210T that receives or "take up" scribing medium. The scribing medium 100 in spool 210S is feed into a first guide block 220A and then to a second guide block 220B. The ferrule 10 with bare fiber section 52 extending therefrom is operably arranged between the first and second guide blocks 220A and 220B so that scribing medium 100 operably resides in wedge location 59. In an example, the first and second guide blocks 220A and 220B are configured so that there is tension in scribing medium 100 that causes the scribing medium to push up against the lower portion 58 of bare fiber section 52.

In an example, the aforementioned abrasive medium 230 is operably arranged between source spool 210S and ferrule 10, e.g., between spool 210S and first guide block 220A. The abrasive medium 230 is arranged such that it forms abrasive feature 120 on scribing medium 100 at top-side location 113, either by directly abrading the scribing medium or by fixedly depositing an abrasive material.

In the operation of scribing system 200, the scribing medium 100 is fed from source spool 210S, through the first and second guide blocks 220A and 220B and then to take-up spool 210T so that the scribing medium runs through wedge location 59 with the aforementioned tension. The take-up spool 210T can then be used to drive the movement of scribing medium 100 through the wire scribing system 200 so that it forms scribe mark 152, as discussed above. Once bare fiber section 52 is scribed, it can be removed from the wire scribing system 200, cleaved at scribe line 152, and the the resulting stub 52S polished down to front-end surface 13 of ferrule front end 12 as described above.

In an example where scribing medium 100 already includes abrasive feature 120 so that abrasive medium 230 is not required, spools 210S and 210T can be operated so that a small section (e.g., 3 inches to 6 inches) of scribing medium 100 moves back and forth to form scribe mark 152.

Figure 6:
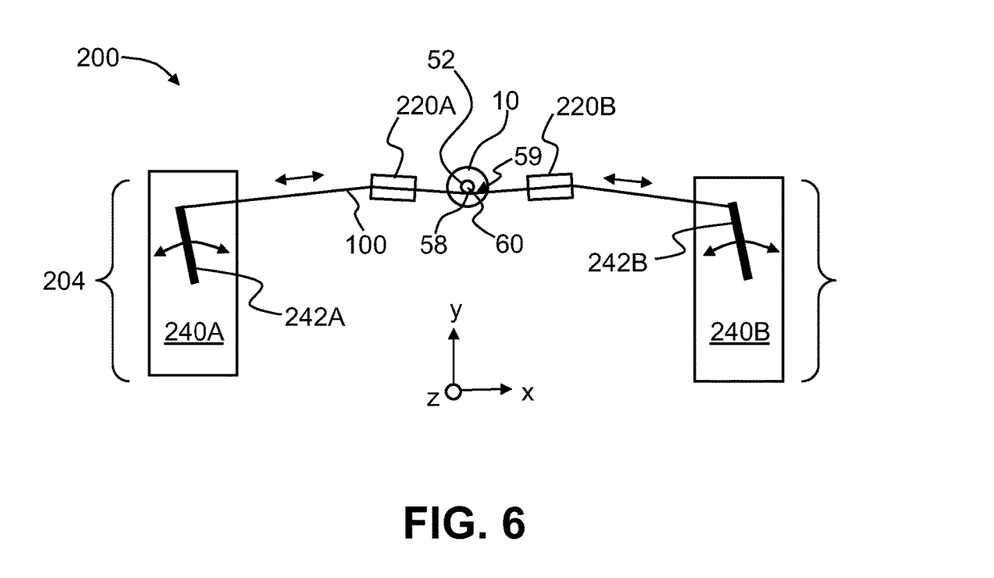
FIG. 6 is a schematic diagram of an example scribing system similar to that shown in FIG. 5, wherein the system includes a support fixture configured to move a section of scribing medium back and forth against the lower portion of the bare fiber section to form the scribe mark.

FIG. 6 is an example embodiment of scribing system 200, wherein scribing medium 100 includes abrasive feature 120 and only utilizes a relatively small section of scribing medium at a given time. The scribing medium 100 is supported by an example support fixture 204, which includes first and second support arms 240A and 240B configured (e.g., with movable support members 242A, 242B, respectively) to hold respective ends of the scribing medium and move the scribing medium back and forth as needed to form scribe line 152.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of scribing at least one bare fiber section of at least one optical fiber, comprising:
    operably supporting the at least one optical fiber in a ferrule so that the at least one bare fiber section extends beyond a front end of the ferrule;
    disposing a top-side location of a scribing medium to be in contact with a lower portion of the at least one bare fiber section and a near-side location of the scribing medium to be in contact with the front end of the ferrule, wherein the top-side location includes an abrasive feature and wherein the near-side location is smooth; and
    moving the scribing medium relative to the at least one bare fiber section to cause the abrasive feature to form in the at least one bare fiber section a scribe mark at a scribe location at a distance from the front end of the ferrule.

2. The method according to claim 1, wherein the distance of the scribe location is substantially equal to a radial dimension of the scribing medium.

3. The method according to claim 2, wherein the radial dimension is in the range of 10 microns to 50 microns.

4. The method according to claim 1, further including cleaving the bare fiber section at the scribe mark.

5. The method according to claim 4, wherein the act of cleaving forms a stub bare fiber section extending beyond the front end of the ferrule, and further comprising polishing the stub bare fiber section to form a polished end face of the bare fiber section that is substantially co-planar with the front end of the ferrule.

6. The method according to claim 1, wherein the abrasive feature has an angular extent $\Delta\theta_A$ in the range $\pi/12$ rads$\leq\Delta\theta_A\leq\pi/2$ rads.

7. The method according to claim 1, wherein the smooth surface at the near-side location defines an angular exclusion range $\Delta\theta_E$ in the range $\pi/2$ rads$\leq\Delta\theta_E\leq 23\pi/12$ rads.

8. The method according to claim 1, further comprising forming the abrasive feature by abrading the scribing medium at the top-side location.

9. The method according to claim 1, wherein the near-side location of the scribing medium remains in contact with the front end of the ferrule for at least some of the act of moving the scribing medium relative to the bare fiber section.

10. The method according to claim 1, wherein the scribing medium comprises a wire.

11. A method of cleaving a bare fiber section of an optical fiber using a scribing medium having a length, a radial dimension, and an outer surface with a top-side location and a near-side location, comprising:

a) supporting the bare fiber section in a bore of a ferrule that includes a front end having a front-end surface, with the bare fiber section extending beyond the front end of the ferrule and having an outer surface with a lower portion that in combination with the front-end surface defines a wedge location;
    b) disposing the scribing medium in the wedge location such that the top-side location is in contact with the lower portion of the bare fiber section and the near-side location is in contact with the front-end surface of the ferrule, wherein the near-side location is smooth and the top-side location includes an abrasive feature that runs along the length of the scribing medium;
    c) moving the scribing medium under tension relative to the bare fiber section so that the abrasive feature defines a scribe mark in the lower portion of the bare fiber section at a distance from the front-end surface that is substantially equal to the radial dimension of the scribing medium, and wherein the smooth near-side surface does not substantially damage the front-end surface; and
    d) cleaving the bare fiber section at the scribe mark.

12. The method according to claim 11, wherein the front-end surface of the ferrule is planar.

13. The method according to claim 11, further comprising supporting the ferrule in an optical fiber connector prior to act b).

14. The method according to claim 11, wherein the smooth surface of the near-side location defines an angular exclusion range $\Delta\theta_E$ in the range $\pi/2$ rads$\leq\Delta\theta_E\leq 23\pi/12$ rads.

15. The method according to claim 11, further comprising forming the abrasive feature by abrading the outer surface of the scribing medium at the top-side location.

16. The method according to claim 11, wherein the scribing medium comprises a scribing wire with a circular cross section with the radial dimension being a radius in a range of 10 microns to 50 microns.

17. The method according to claim 11, wherein cleaving the bare fiber section in act d) forms a bare fiber section stub, and further including polishing the bare fiber section stub to form an end face of the bare fiber section that is substantially co-planar with the front-end surface of the ferrule.

18. The method according to claim 11, wherein the scribing medium comprises a wire and is made of either tungsten, nickel-chromium, stainless steel, copper, polymer or a monofilament.

19. The method according to claim 11, wherein moving the scribing medium in act c) includes either moving the scribing medium in a single direction or moving the scribing medium back and forth over a select portion of the scribing medium.

20. A system for forming a scribe mark in at least one bare fiber section of at least one optical fiber, comprising:
    a ferrule having at least one bore and a front end that defines a front-end surface, the at least one bore being configured to support the at least one optical fiber with the at least one bare fiber section extending beyond the ferrule front end;
    a scribing medium having a radial dimension and an outer surface with a top-side location that includes an abrasive feature and a near-side location that is smooth, wherein the scribing medium is disposed with the near-side location in contact with the front-end surface and the abrasive feature in contact with a lower portion of the at least one bare fiber section, and wherein the scribing medium comprises a scribing wire; and a support fixture that movably supports the scribing medium and that causes the scribing medium to move relative to the at least one bare fiber section to form the scribe mark in the lower portion of the at least one bare fiber section at a distance from the front-end surface that is substantially equal to the radial dimension of the scribing medium.

21. The system according to claim 20, wherein the radial dimension of the scribing medium is in the range of 10 microns to 50 microns.

22. The system according to claim 20, wherein the support fixture includes a source spool and a take-up spool.

23. The system according to claim 20, wherein the scribing medium is made of is made of either tungsten, nickel-chromium, stainless steel, copper, polymer or a monofilament.

24. The system according to claim 20, wherein the abrasive feature has an angular extent $\Delta\theta_A$ in the range $\pi/12$ rads$\leq\Delta\theta_A\leq\pi/2$ rads.

* * * * *

UNITED STATES PATENT AND TRADEMARK OFFICE
CERTIFICATE OF CORRECTION

PATENT NO. : 10,295,747 B2
APPLICATION NO. : 15/145928
DATED : May 21, 2019
INVENTOR(S) : Steven Joseph Gregorski It is certified that error appears in the above-identified patent and that said Letters Patent is hereby corrected as shown below:

In the Claims

In Column 11, Line 14, Claim 23, delete "medium is made of" and insert -- medium --, therefor.

Signed and Sealed this
Twentieth Day of August, 2019

Andrei Iancu
*Director of the United States Patent and Trademark Office*